(12) United States Patent
Emerson, III (10) Patent No.: US 6,404,408 B1
(45) Date of Patent: Jun. 11, 2002

(54) ENHANCED RADIO GRAPHIC DATA SYSTEM

(75) Inventor: Harry E. Emerson, III, Budd Lake, NJ (US)

(73) Assignee: Surfer Network.Com, Inc., Mount Olive, NJ (US)

(*) Notice: Subject to any disclaimer, the term of this patent is extended or adjusted under 35 U.S.C. 154(b) by 0 days.

(21) Appl. No.: 09/478,023

(22) Filed: Jan. 5, 2000

Related U.S. Application Data (60) Provisional application No. 60/115,074, filed on Jan. 7, 1999.

(51) Int. Cl.[7] .................................................. G09G 5/00
(52) U.S. Cl. ............................ 345/2.1; 375/216; 381/3
(58) Field of Search ........................... 345/2.1, 2.3, 1.2, 345/1.3, 736, 740, 24; 370/345, 485, 495, 749, 474, 498, 71, 73, 76, 77, 496, 307, 343, 480, 486, 487, 528; 455/351, 347; 375/260, 369; 381/2–4

(56) References Cited

U.S. PATENT DOCUMENTS

| | | | |
|---|---|---|---|
| 5,239,540 A | 8/1993 | Rovira et al. ................... 370/77 |
| 5,295,154 A | 3/1994 | Meier et al. ..................... 375/1 |
| 5,519,834 A | 5/1996 | Kamerman et al. ..... 395/200.06 |
| 5,581,576 A | * 12/1996 | Lanzetta et al. ............. 375/216 |
| 5,588,022 A | * 12/1996 | Dapper et al. ............... 375/216 |
| 5,722,041 A | 2/1998 | Freadman .................... 455/6.3 |
| 5,790,958 A | 8/1998 | McCoy et al. ............... 455/557 |
| 5,810,603 A | 9/1998 | Kato et al. ............... 434/307 A |
| 5,812,777 A | 9/1998 | Leigh .................... 395/200.47 |
| 5,825,814 A | 10/1998 | Detwiler et al. ............. 375/219 |
| 5,838,926 A | 11/1998 | Yamagishi ............. 395/200.79 |
| 5,841,979 A | 11/1998 | Schulhof et al. ....... 395/200.67 |
| 6,282,180 B1 | * 8/2001 | Paneth et al. ................ 370/478 |

OTHER PUBLICATIONS

Edward C. Luczak, Global Bus Computer Communication Techniques, 1978.

* cited by examiner

*Primary Examiner*—Bipin Shalwala
*Assistant Examiner*—Mansour M. Said
(74) *Attorney, Agent, or Firm*—Ernest D. Buff & Associates, LLC; Ernest D. Buff; Gordon E. Fish (57) ABSTRACT

An enhanced radio graphic data system comprises an FM receiver, RDS demodulator and decoder, display, microprocessor and memory. The system incorporates a protocol enhancement of RDS involving the redefinition of several bits within the B-block. An accompanying arrangement utilizes data in the C- and D-Blocks to create message streams containing the text data to be presented along with associated formatting instructions.

3 Claims, 5 Drawing Sheets

A GROUP MESSAGE STRUCTURE

A Group Messages

| A-block | B-block | | | C-block | | D-block | |
|---|---|---|---|---|---|---|---|
| Station ID (PI code) | Group Type | PTY | CNT | Data Byte1 | Byte2 | Data Byte3 | Byte4 |

CNT = Control bits

B GROUP MESSAGE STRUCTURE

B Group Control Data

| A-block | B-block | | | C-block | D-block | |
|---|---|---|---|---|---|---|
| Station ID (PI code) | Group Type | PTY | CNT | Station ID (PI code) | Data Byte1 | Byte2 |

CNT = Control bits

| 15... | | | | 11, | 10, | 9... | | | | 5, 4... | | | | 0 |
|---|---|---|---|---|---|---|---|---|---|---|---|---|---|---|
| G | G | G | G | A-B | TP | P | P | P | P | P | V | V | V | V | V | where:

G= Group Type
        A/B= Group Type A or B
        TP= Traffic Program
        P= PTY
        V= Variable Dependent on Group Type

RDS B-Block Coding

A GROUP MESSAGE STRUCTURE

A Group Messages

| A-block | B-block | | | C-block | D-block |
|---|---|---|---|---|---|
| Station ID (PI code) | Group Type | PTY | CNT | Data Byte1 Byte2 | Data Byte3 Byte4 |

CNT = Control bits

B GROUP MESSAGE STRUCTURE

B Group Control Data

| A-block | B-block | | | C-block | D-block |
|---|---|---|---|---|---|
| Station ID (PI code) | Group Type | PTY | CNT | Station ID (PI code) | Data Byte1 Byte2 |

CNT = Control bits

Figure 5

ENHANCED RADIO GRAPHIC DATA SYSTEM

CROSS REFERENCE TO RELATED APPLICATIONS

This application claims the benefit of U.S. Provisional Patent Application No. 60/115,074, filed Jan. 7, 1999, entitled "Enhanced Radio Graphic Data System".

BACKGROUND OF THE INVENTION

1. Field of the Invention

The present invention relates to a communication system for transmitting and receiving enhanced text and graphics with commercial FM radio broadcasts; and more particularly, to a radio communication system wherein the enhanced text and graphics are displayed in color on the face of a radio receiver.

2. Description of the Prior Art

The Radio Data Systems (RDS) was developed in Germany in the 1980s as an outgrowth of a traffic alerting system. It is widespread throughout Europe, and was introduced into the US in 1993 where it is known as Radio Broadcast Data System (RBDS). In 1997, numerous automakers introduced RDS radios in the US. RDS uses a low data rate digital subcarrier at 57 kHz to transmit data such as a station's call letters or program type (Jazz, etc.) along with the main radio signal. The data rate is 1187.5 bits per second, equivalent to a 1200 baud modem, although after overhead and mandatory protocol elements are accounted for the remaining data rate available to applications is about 300 bits per second. There is also a provision for sending 32 or 64 character text messages, referred to as "Radio Text". The data is typically displayed on a small monochrome text screen mounted on the radio's face. Most commonly, this screen is 8 characters long, and Radio Text messages are scrolled across the screen to present the entire message.

The RBDS standard is created and published by the National Radio Systems Committee (NRSC), formed jointly by the National Association of Broadcasters (NAB) and the Consumer Electronics Manufacturers Association (CEMA), a division of the Electronics Industry Association (EIA). The RBDS standard is a derivative of the RDS standard published by the European Broadcasting Union, headquartered in Geneva, Switzerland, as CENELEC EN50067.

The RDS data stream consists of 16-bit blocks called A, B, C, and D, which are transmitted sequentially in endless repetition. Each block carries a specific data type, which is defined by the RDS protocol. The A block always carries the radio station ID, B-blocks contain control information, the C block carries either station ID or data, and the D-blocks contain data. Each specific arrangement of A, B, C, and D blocks is called a group, of which there are 32 types, divided into 16 type A groups, and 16 type B groups. The RDS and RBDS standards define specific meanings or applications for several of these groups, while several groups remain unused and undefined. The first four bits of the B block defines to the group number of the possible 16 groups within a group type, and the next bit defines if it is a group type A (bit 5=0) or a group of type B (bit 5=1). Group types are referred to with the notation 0A, 0B through 15A, 15B. The distinguishing character of group type B is that the station ID from the A-Block is duplicated in the C-block of the group, making this slot unavailable for data. In the US, the station ID serves no purpose.

The Group Type determines the application, and thereby the definition of all the variable bits in the B-Block. Only one or two applications can be defined by an individual Group Type, that matter being determined by whether the C- and D-Blocks will be used for the same application, or whether the C-Block will carry one application while the D-Block will carry another. As an example, the Group 0A has two applications, one in which the C-Block carries Alternate Frequency information, and one in which the D-block carries Program Service information (also called Slogan).

Two individual bits in the B block are used for highway traffic announcement related indicators (the TP bit, and the TA bit). The TP bit assignment is common to all group types, while the TA bit assignment is only defined in three of the group types. In the prior art, the B block was configured as described in FIG. 2.

Several deficiencies and proposed solutions of the present arrangement of RDS/RBDS are described in co-pending U.S. patent application Ser. No. 60/115072 filed Jan. 7, 1999 entitled Enhanced Radio Data System, the entire disclosure of which is incorporated herein by reference thereto. The present invention, Enhanced Radio Graphics Data System, is a significant enhancement over RDS that can work in companionship with the improvements shown in Ser. No. 60/115072. One of the deficiencies described in Ser. No. 60/115072 relates to the RDS feature of Radio Text. Radio Text is implemented in application groups 2A and 2B. The Radio Text feature of Group Type 2A transmits a text stream of 64-characters; the Group Type 2B version of Radio Text transmits a 32-character text stream. The data transmitted by either version is a monolithic chunk, meaning the receiver treats it as a single chunk of 32-characters, or a single chunk of 64-characters. In addition, the protocol allows no identification as to what the data being carried represents. In other words, the data could be a string of asterisks, a message like "Welcome to WQXR New York's Classical Radio Station", a phone number, or any other piece of information. The receiving radio has no way to tell the nature of this data or how to use it. The data can be displayed, and nothing else. An additional limitation of Radio Text is that it does not support presentation information describing how the information is to be display on a screen. An accompanying limitation of RDS is that, due to the extremely limited availability of control bits in the B-Block, it does not support the transmission of the large amounts of data necessary to create color graphic information representations.

The Enhanced Radio Graphics Data System incorporates a color graphics protocol enhancement of RDS. This new protocol, which is backward compatible with RDS i,=3j- receivers, enables RDS to transmit data such as "Artist & Title," "Coming Next," DJ names, advertisements, phone numbers, etc. in color and different text styles (bold, italic, etc.) and sizes for presentation on a color display screen. The Enhanced Radio Graphics Data System receiver comprises an FM receiver, RDS demodulator and decoder, a color display, microprocessor and memory.

The present invention is a significant benefit to radio listeners in that it allows the listener to know what is playing, the artist and title, and other information about the music, station, DJ, etc., and that such information can be presented in an appealing fashion on a color graphic display screen.

The present invention is a significant benefit to radio broadcaster in that it allows the broadcaster to display on a radio: a) station call letters; b) tag lines, such as "Classic Rock of the 80's and 90's"; c) phone numbers; artist and title; d) "Coming Next" announcement; e) advertisement messages; and f) station promos in color and different text styles and sizes.

SUMMARY OF THE INVENTION

The present invention, referred to herein as "Enhanced Radio Graphic Data System", represents a significant improvement over RDS. The Enhanced Radio Graphic Data System affords enhancements over both RDS and RBDS. As used herein, the term "RDS" is applied in a generic fashion to mean both RDS and RBDS transmission standards and receivers. Where there might be a difference between the U.S. and European standards, the term "RBDS" is used to refer specifically to the U.S. standard.

Figure 3:
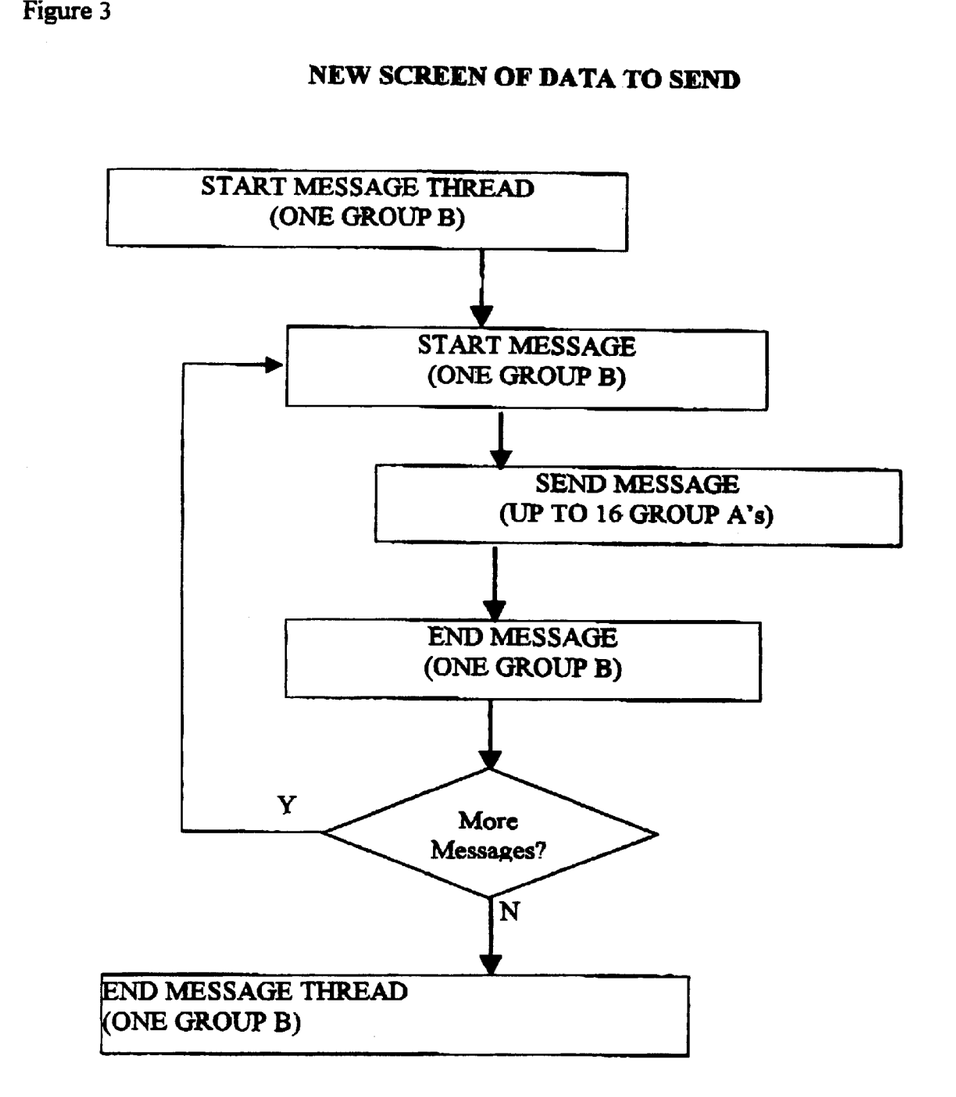
FIG. 3 is an illustration of the bit placement and coding of the B-Block in the current invention.
Figure 4:
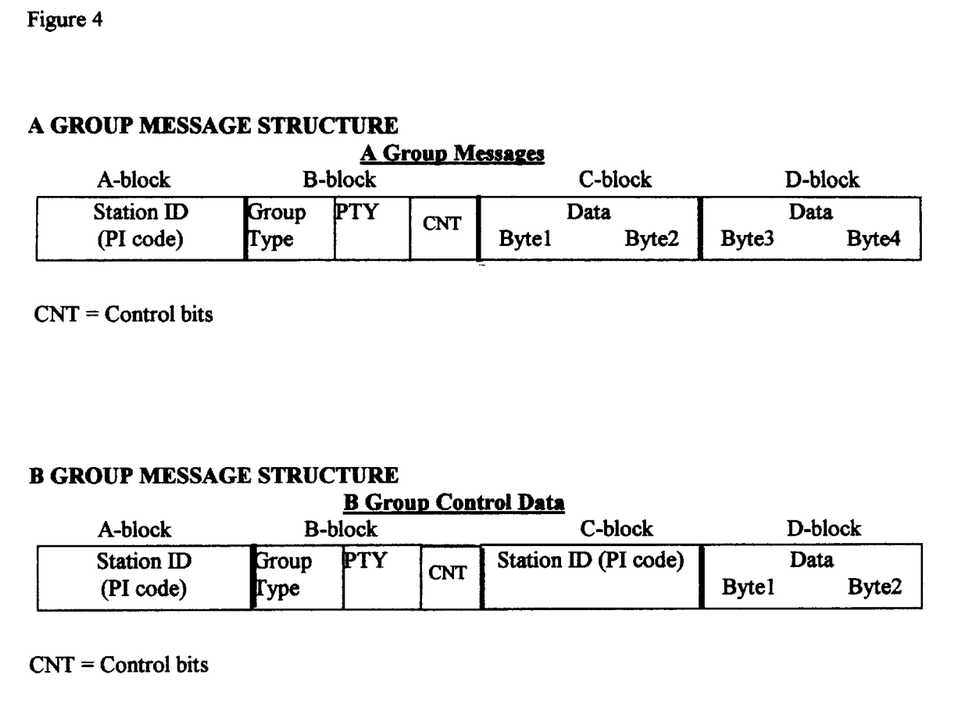
FIG. 4 is an illustration of the C- and D-Block coding enabling the present invention to create large and detailed messages that convey both text as well as associated text formatting information, within the scope of the existing RDS protocol structure.

The Enhanced Radio Graphic Data System incorporates a protocol enhancement of RDS involving the redefinition of several bits within the B-block as illustrated in FIG. 3, with an accompanying arrangement utilizing data in the C- and D-Blocks to create message streams containing the text data to be presented along with associated formatting instructions, as illustrated in FIG. 4.

Broadly stated, from an end-to-end system perspective, the invention provides an Enhanced Radio Graphic Data System comprising the same transmission and receiver elements as today's RDS and RBDS. These transmission and receiver elements comprise: (i) a generating means for generating a carrier wave at a first predetermined frequency and a subcarrier wave at a second predetermined frequency; (ii) an encoding means for coding the text; (iii) a first modulation means for encoding the subcarrier with the text data generating an encoded subcarrier; (iv) a scheduling means for scheduling the encoding of the subcarrier wave at predetermined intervals; (v) a summing means for adding the audio signal and encoded subcarrier thereby generating a summed signal; (vi) a second modulation means for encoding the carrier wave with the summed signal thereby generating a modulated carrier wave containing both audio signal and text data; (vii) a transmission means for transmitting the modulated carrier wave; (viii) a receiving means for receiving the modulated carrier wave; (ix) a decoding means for decoding the audio signal and the text from the modulated carrier wave; (x) storage means for storing decoded text; (xi) a display means for displaying the text messages; and (xii) an audio signal playing means.

The invention also provides a method for encoding color graphics and text messages into a commercial radio transmission. Generally stated, the method comprises the steps of: (i) storing into memory a text message and graphics bits, the graphics bits indicating the size, style, and color of said text message; (ii) generating a subcarrier of the carrier frequency of the radio transmission; (iii) segmenting the text message into text segments and along with the graphics bits into blocks of binary data; (iv) assembling the blocks into groups of four blocks each, the groups comprising a data stream for transmission; (v) encoding the groups with control bits, the control bits indicating the beginning and end of the text segments, and the number and location in the data stream of the text segments that comprise a complete message; (vi) modulating the subcarrier with the data stream; and transmitting the modulated subcarrier as part of said carrier frequency.

Like RDS receivers, the Enhanced Radio Graphic Data System receiver comprises an FM receiver, RDS demodulator and decoder, display, microprocessor and memory.

BRIEF DESCRIPTION OF THE DRAWINGS

The invention will be more fully understood and further advantages will become apparent when reference is had to the following detailed description and the accompanying drawings, in which.

DESCRIPTION OF THE PREFERRED EMBODIMENTS

Figure 1:
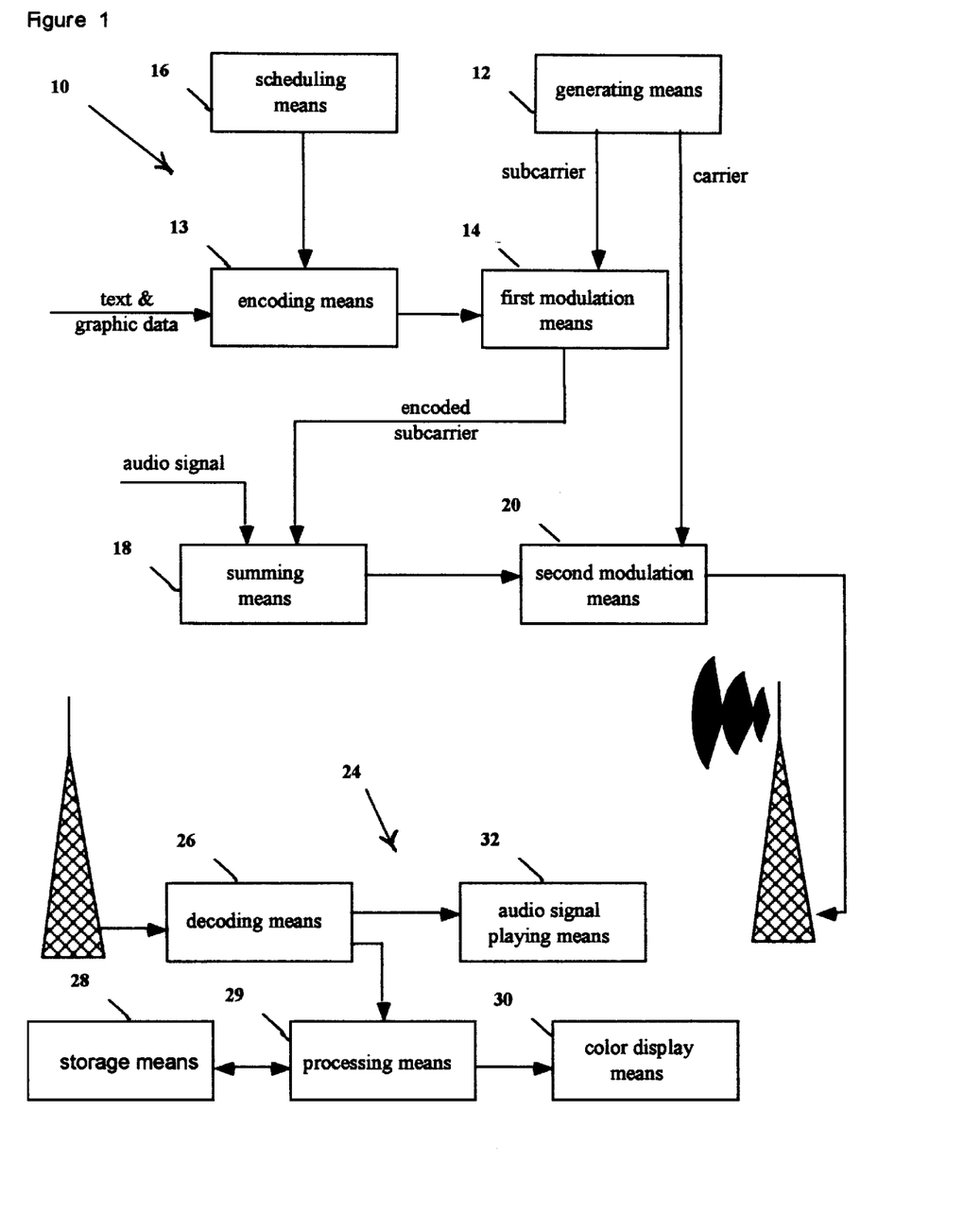
FIG.1 is a block diagram illustrating the components in an RDS broadcasting and receiving system, and the process of encoding data onto a sub-carrier, and then modulating the encoded data along with audio onto the radio station's main carrier frequency.

Referring to FIG. 1 of the drawings, there is shown, generally at 10, a radio system incorporating the elements of the present invention. The radio system comprises a transmitting system, shown generally at 10, and a receiving system, shown generally at 24, the systems 10 and 24 being further comprised of: a generating means 12 for generating a carrier wave at a first predetermined frequency and a subcarrier wave at a second predetermined frequency; an encoding means 13 for encoding text and graphic data; a first modulation means 14 for encoding the subcarrier with the text data generating an encoded subcarrier; a scheduling means 16 for scheduling the encoding of the subcarrier wave at predetermined intervals; a summing means 18 for adding the audio signal and encoded subcarrier thereby generating a summed signal; a second modulation means 20 for encoding the carrier wave with the summed signal, thereby generating a modulated carrier wave containing both audio signal and text data; a transmission means 22 for transmitting the modulated carrier wave; a receiving means 24 for receiving the modulated carrier wave; a decoding 26 means for decoding the audio signal and the text from the modulated carrier wave; storage means 28 for storing decoded text; processing means 29 for formatting decoded text and graphic data for visual presentation on a display; a display means 30 for displaying the text messages; and an audio signal playing means 32.

Consistent with existing procedures for RDS in which bits 11–15 of the B-Block enumerate Group Types, the Enhanced Radio Graphic Data System is described herein as being an RDS application using a pair of available Group Types such as 12A and 12B. The present invention provides a new application and associated protocol for RDS. The protocol redefines the Variable bits in the B-Block within this application in a specific fashion, and allows control bits to be sent along with text in the C- and D-Blocks, enabling the construction of long messages. The control bits tell the processor the beginning and end of text sequences, and the number and location in the data stream of text sequences to make a message for display.

Figure 2:
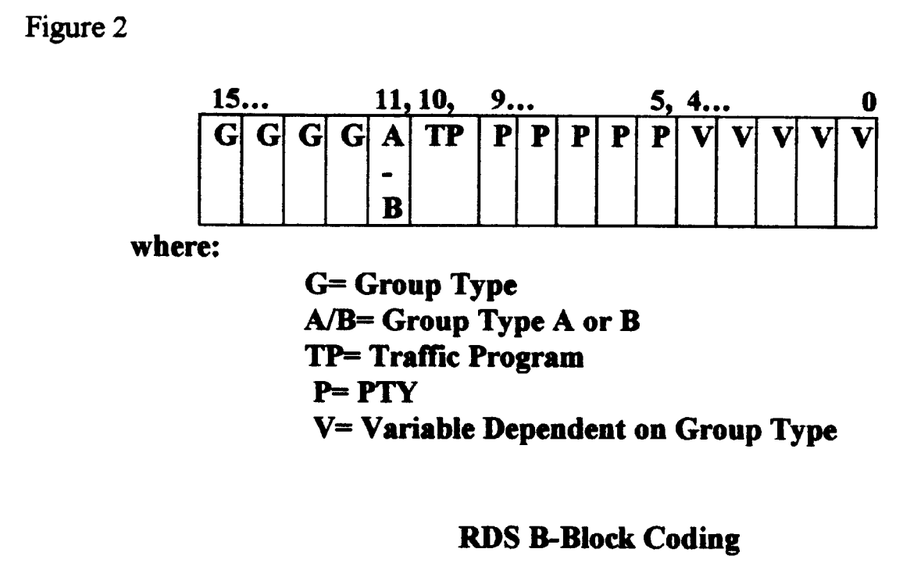
FIG. 2 is an illustration of the bit placement and coding of the prior art B-Block of the RDS/RBDS protocol.

In one version, this invention will utilize two RDS Group Types, and will utilize the least significant four Variable bits to manage the overall message construction. FIG. 2 illustrates the RDS B-Block format wherein the Group Types are defined by the bits indicated as G, and the Variable bits are indicated by V.

ENHANCED RADIO GRAPHIC DATA SYSTEM MESSAGING ARRANGEMENT

The basic idea underlying the Enhanced Radio Graphic Data System protocol is to make up for the limitations imposed by the RDS protocol by using the available bits in a unique way. There are only 5 variable bits available in the B-block, and this is insufficient to convey the number of different meanings required for transmission of the kind of useful information selected. Therefore, the present invention specifies using B Groups (e.g. Group 12B) as message control information to manage the sequencing of A Groups (e.g. Group 12A), which contain text and text formatting data. B Groups both precede A Groups as an indicator of the type of data contained in the A Group data blocks, and then follow the A Group for error detection and correction. The key to this arrangement is that B Groups are uniquely identifiable from A Group due to the A/B bit in the B-block. Other approaches utilizing alternative available bits in the B-Block are possible in which an alternative bit may be used to emulate the Group A/B meaning of bit 11. In this case, only a single RDS Group Type is used.

OVERVIEW

1. Each screen of data is assigned a high level message thread number so receivers don't confuse data from one screen sequence to another. Every message element constituting a single screen of data is associated with this message thread number. The terminology of a "message thread" is similar in concept to an Internet discussion group message thread consisting of all messages related to a topic. New screens of data are assigned sequential message thread numbers.
2. A pair of B Groups frame a message thread or a message within a thread. The B-Block within the B Group identifies the thread number as well as indicating one of: thread start, thread end, message start, or message end. The D-Block within the B Group identifies either: the number of A-Groups containing the message, the message type, and the message number of the message to be sent; or, the checksum/CRC for the message that has been sent.
3. Each message thread may be composed of up to 64 individual messages, carried in the A Groups, where each message may define a text string, or one or more text attributes (font, size, color, screen location, etc.) or graphic attributes (line, shape, color, etc.).
4. A sequence of up to 16 A Groups carries each actual message, 4 bytes per A-Group message segment (two in the C-Block and two in the D-Block), totaling up to 64 bytes per message.

ENHANCED RADIO GRAPHIC DATA SYSTEM
MESSAGE FLOW

Referring to FIG. 3 of the drawings, there is shown a flow chart illustrating a concept central to the present invention, as described below.

START MESSAGE THREAD 10: indicates that a screen display has been generated by some process, the specific nature of which is not relevant to this embodiment. First a Group B is transmitted that indicates the start of a new message thread and includes a thread number in the range 0–3 using the variable counter bits in the B-block. Each new thread takes the next number in sequence, and the numbering allows the receiver to be displaying one message thread while receiving another without getting data confused between screen images.

START MESSAGE 12: Next a Group B is transmitted indicating the nature of the following Group A(s) messages 14.

SEND MESSAGE 14: One to sixteen Group A's are then transmitted containing a particular data element for the screen image. The data contained in a sequential series of Group A's constitutes a "message". Up to 64 messages can be sent to describe a single screen image, each message consisting of up to sixteen Group A's.

END MESSAGE 16: A Group B is then transmitted indicating the end of the preceding message, and containing a Cyclic Redundancy Check (CRC) or checksum for error checking and correction of the data in the preceding Group A's.

The above sequence of START MESSAGE, SEND MESSAGE, and MESSAGE END continues until all messages in the current message thread have been sent.

END MESSAGE THREAD 20: A Group B "thread end" follows, containing a flag that indicates whether or not the screen image is to be displayed at this time. Since screen images will be replaced, typically every 30 seconds or so, and since it may take several seconds to transmit one screen image, and since each group needs to be transmitted two or three times to ensure that the receiver received it correctly, a receiver may receive a screen image long before the image should be displayed. Therefore, the "display" flag provides a way of telling the receiver when it should display an image it has received. The B Group Thread End with Display can be sent by itself to indicate to the receiver that a previously transmitted screen is now to be displayed.

ENHANCED RADIO GRAPHIC DATA SYSTEM
PROTOCOL DETAILS

In FIG. 4. there is shown the RDS Group structure for A Groups and B Groups. The A Group structure is described hereinafter in more detail.

The B Group structure uses a combination of the "variable" counter bits and data in the D-block to create the control information for the associated A Group(s). Two of the four counter bits (bit positions 3 and 2) will be used as a flag to indicate thread start/end, and message start/end. The remaining two bits (bit positions 1 and 0) will be used to indicate the message thread number (0 thru 3) of the current message. The data in the D-block is associated with these flag conditions, as set forth below in Table I.

TABLE I

B GROUP MESSAGE CONTROL PARAMETERS

B-Block Control bits

| Flag bits 3 & 2 | Counter bits 1 & 0 | D-Block Control Data |
|---|---|---|
| 00 = Thread start | | 6 bits (positions 5–0) indicating the number of A Group messages in the thread. 000000 = message #1. Remaining bits set to 0. |
| 01 = Thread end | | All bits set to either 0 (don't display) or 1 (display). When receiver detects thread end with display flag set to 1, it presents the screen image on the display for the message thread just received. |
| 10 = Message start | | 4 bits (positions 15–12) indicate # of A-groups in the message (0000 = 1 group, 1111 = 16 groups) 6 bits (positions 11–6) indicate the message number within the thread (64 p;ossible messages, 000000 = 1) 6 bits (positions 5–0) indicate the message type (see Message Type table) |
| 11 = Message end | | 16 bit CRC or Checksum. |
| | 00 = Thread 0 | |

TABLE I-continued

B GROUP MESSAGE CONTROL PARAMETERS

B-Block Control bits

| Flag bits 3 & 2 | Counter bits 1 & 0 | D-Block Control Data |
|---|---|---|
| | 01 = Thread 1 | |
| | 10 = Thread 2 | |
| | 11 = Thread 3 | |

MESSAGE TYPES: Message types are defined in B Groups by six bits in the D-block in bit positions 5–0 and are used to indicate the nature of the data, such as text, screen color, fonts, font color, and text location, contained in the associated A Group(s). The diagram of FIG. 5 identifies a possible screen layout to illustrate these concepts, recognizing that there are many suitable ways of doing so.

Figure 5:
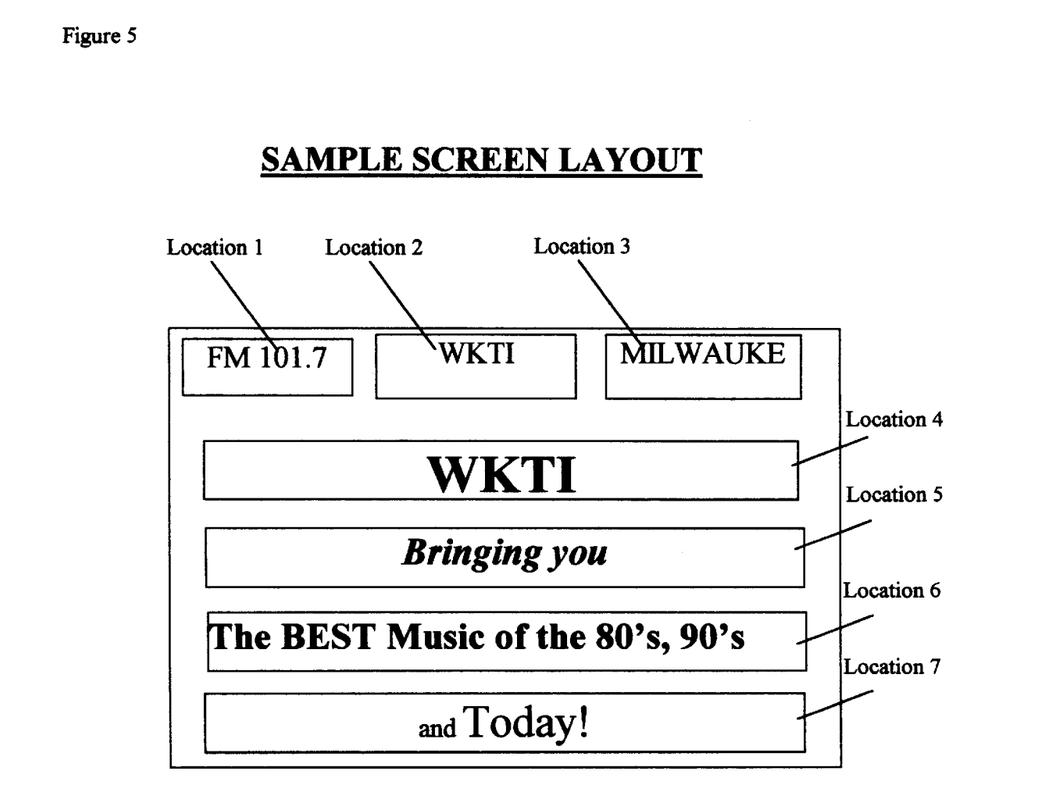
FIG. 5 is a sample screen layout illustrating a method of creating message segments by organizing the screen display into location segments.

Table II lays out the Message Types that will be used in conjunction with the sample screen layout illustration of FIG. 5. Each location can have its own background color set separately from the text color (foreground color). The font typefaces, point sizes, and font colors may be specified. The "Location X cont'd" allows inserting words on the same line but with different attributes, such as font color, or font meaning to identify phone numbers and so on. In review, Message Types are carried in the D-Block of the B Groups, in bit positions 5–0.

TABLE II

MESSAGE TYPES

| Message Type (64 poss) | Binary Representation of bits 5–0 | Meaning |
|---|---|---|
| 0 | 000000 | Screen color |
| 1 | 000001 | Location #1 format |
| 2 | 000010 | Location #1 text |
| 3 | 000011 | Location #2 format |
| 4 | 000100 | Location #2 text |
| 5 | 000101 | Location #3 format |
| 6 | 000110 | Location #3 text |
| 7 | 000111 | Location #4 format |
| 8 | 001000 | Location #4 text |
| 9 | 001001 | Location #5 format |
| 10 | 001010 | Location #5 text |
| 11 | 001011 | Location #6 format |
| 12 | 001100 | Location #6 text |
| 13 | 001101 | Location #7 format |
| 14 | 001110 | Location #7 text |
| 15 | 001111 | Location #1 format cont'd |
| 16 | 010000 | Location #1 text cont'd |
| 17 | 010001 | Location #2 format cont'd |
| 18 | 010010 | Location #2 text cont'd |
| 19 | 010011 | Location #3 format cont'd |
| 20 | 010100 | Location #3 text cont'd |
| 21 | 010101 | Location #4 format cont'd |
| 22 | 010110 | Location #4 text cont'd |
| 23 | 010111 | Location #5 format cont'd |
| 24 | 011000 | Location #5 text cont'd |
| 25 | 011001 | Location #6 format cont'd |
| 26 | 011010 | Location #6 text cont'd |
| 27 | 011011 | Location #7 format cont'd |

TABLE II-continued

MESSAGE TYPES

| Message Type (64 poss) | Binary Representation of bits 5–0 | Meaning |
|---|---|---|
| 28 | 011100 | Location #7 text cont'd |
| . | . | . |
| . | . | . |
| . | . | . |
| 63 | 111111 | Future use. |

A GROUP MESSAGE STRUCTURE

FIG. 4. illustrates the RDS Group structure for A Groups and B Groups. The B Group has been previously discussed. The A Group structure is fairly simple—A Groups carry the text or data to create a screen image, which might require a series of A Groups to transmit a single message, and multiple series transmitted in succession to convey the entire message thread. Each message can consist of up to 64 characters sent four characters at a time in up to sixteen chunks. Four B-block counter bits (bits 3–0) serve as a counter to indicate which message element of the 16 possible chunks is currently being transmitted. These bits are set dynamically every time an A Group is transmitted. The C- and D-blocks carry the data, two characters (16 bits) per block. Thus, in conveying text, an A Group message can carry 4 ASCII characters in 8 bits-per-character mode (this is called extended ASCII) and a series of 16 A Groups can carry a total of 64 characters constituting a single "message".

A Groups carry the following types of data as defined in Table II: the screen color, the format for a text location on the screen, or the text to place at a text location on the screen. The details on text have just been described. Following are the descriptions of A Group coding for screen color and text location formatting.

A GROUP SCREEN PAINTING PARAMETERS

TEXT: Text itself is transmitted in Group 12A; as described hereinabove.

COLORS—general: Screen and font colors are derived from a common color reference chart (not shown) of the conventional type. Colors are identified by single byte (8 bit) values, although other color identification methods could be chosen. For concept demonstration purposes herein, screen color in the protocol is specified as a single byte in leftmost byte in the C-block and the remaining bytes in the C- and D-blocks are set to zero.

LOCATION FORMAT: the location format message types for data carried in the A Groups are as follows:

1. Two leftmost bits in the C-block define one of four font typefaces—for purposes of this application, the particular fonts that might be chosen are irrelevant.
2. Next two bits are font attribute (00=normal, 01=bold, 10=italic, 11=both).
3. Next six bits are font size in points, allowing up to 64 point size to be displayed (000000=1 point).
4. Next two bits specify text justification (00=left, 01=centered, 10=right, 11=unused).
5. Rightmost four bits in the C-block identify the text meaning of the text (phone number, etc.). See the following Text Meaning table for details.
6. Leftmost byte in the D-block is the font color.
7. Rightmost byte in the D-block is the text location background color, which could be different from the screen color and different from the font color.

TEXT MEANING: Text Meaning provides the ability to identify unique data elements so that a computer in the receiver can properly handle the data, in particular information like phone and fax numbers, e-mail addresses, web addresses, and the like. Typically those types of information might be imbedded as apart of a line of text, as in the example: "Call us at 800-111-9999". Only the phone number itself should be identified as a phone number. The "cont'd" Location identifier in the Messages Types provides the ability to write some text in one message with a normal text meaning, and then come back and continue the line with more text with a special text meaning. Text Meanings might be defined as set forth below in Table III, utilizing 4 bits in the C-Block, and having 16 possible meanings:

TABLE III

TEXT MEANING

| # | Binary | Text Meaning |
|---|--------|--------------|
| 0 | 0000 | normal |
| 1 | 0001 | radio station phone number 1 |
| 2 | 0010 | radio station phone number 2 |
| 3 | 0011 | radio station fax number |
| 4 | 0100 | radio station email address |
| 5 | 0101 | radio station web address |
| 6 | 0110 | advertiser phone number 1 |
| 7 | 0111 | advertiser phone number 2 |
| 8 | 1000 | advertiser fax number |
| 9 | 1001 | advertiser email address |
| 10 | 1010 | advertiser web address |
| 11 | 1011 | Artist |
| 12 | 1100 | Title |
| 13 | 1101 | Album/CD name |
| 14 | 1110 | Record Label |
| 15 | 1111 | undefined |

Having thus described the invention in rather full detail, it will be understood that such detail need not be strictly adhered to, but that various changes and modifications may suggest themselves to one skilled in the art, all falling within the scope of the invention, as defined by the subjoined claims.

What is claimed is:

1. A method for encoding color graphics and text messages for display on a color graphic screen into a commercial radio transmission, comprising the steps of:
   a) storing into memory a text message and graphics bits, said graphics bits indicating the size, style, and color of said text message;
   b) generating a subcarrier of the carrier frequency of said radio transmission;
   c) segmenting said text message into text segments and along with said graphics bits into blocks of binary data;
   d) assembling said blocks into groups of four blocks each, said groups comprising a data stream for transmission;
   e) encoding said groups with control bits, said control bits indicating the beginning and end of said text segments, and the number and location in the data stream of said text segments that comprise a complete message;
   f) modulating said subcarrier with said data stream; and
   g) transmitting said modulated subcarrier as part of said carrier frequency for receipt and display on a radio receiver.

2. A method for encoding color graphics and text messages for display on a color graphic screen into a commercial radio transmission, comprising the steps of:
   a) storing into memory a text message and graphics bits, said graphics bits indicating the size, style, and color of said text message;
   b) generating a subcarrier of the carrier frequency of said radio transmission;
   c) segmenting said text message into text segments and along with said graphics bits into blocks of binary data;
   d) assembling said blocks into groups of four blocks each, said groups comprising a data stream for transmission;
   e) said groups further defining applications;
   f) creating within said applications two types of information elements, one type controlling the message flow of screen display information to be transmitted, the other transmitting the actual screen display information;
   g) said message flow application enumerating individual of entire messages to be displayed, and indicating the beginning and the end of each such entire message;
   h) said message flow application further enumerating individual message segments within an entire message, and indicating the beginning and the end of each such message segment;
   i) said message flow application further identifying the nature of the data contained in each of said message segments;
   j) modulating said subcarrier with said data stream; and
   k) transmitting said modulated subcarrier as part of said carrier frequency for receipt and display on a radio receiver.

3. A commercial radio band transmission and receiving system for audio signal, text and graphic data, comprising:
   a) a generating means for generating a carrier wave at a first predetermined frequency and a subcarrier wave at a second predetermined frequency;
   b) an encoding means for coding said text and graphic data, and control data into groups of binary information, said graphic data comprising instructions for creating color graphic display of said text, said control data identifying the beginning and end of a message comprised of said text, message verification, and message blocks extending over multiple data groups;
   c) a first modulation means for encoding said subcarrier with said text data generating an encoded subcarrier;
   d) a scheduling means for scheduling the encoding of said subcarrier wave at predetermined intervals;
   e) a summing means for adding said audio signal and encoded subcarrier thereby generating a summed signal;
   f) a second modulation means for en coding said carrier wave with said summed signal thereby generating a modulated carrier wave containing both audio signal and text data;
   g) a transmission means for transmitting the modulated carrier wave;
   h) a receiving means for receiving said modulated carrier wave;
   i) a decoding means for decoding said audio signal and said text and graphic data from said modulated carrier wave;
   j) a storage means for storing decoded text and graphic data;
   k) a display means for interpreting and displaying color images and text messages;
   l) a processing means for drawing color images and text messages from said text and graphic data; and
   m) an audio signal playing means.

* * * * *